United States Patent [19]
Ishibai et al.

[11] Patent Number: 5,020,888
[45] Date of Patent: Jun. 4, 1991

[54] ASPHERICAL GLASS LENS ELEMENT SUITABLE FOR A COLLIMATOR LENS

[75] Inventors: Isao Ishibai; Hitonobu Otsu, both of Tokyo, Japan

[73] Assignee: Hoya Corporation, Tokyo, Japan

[21] Appl. No.: 491,262

[22] Filed: Mar. 9, 1990

[30] Foreign Application Priority Data

Mar. 9, 1989 [JP] Japan ............................... 1-55052

[51] Int. Cl.$^5$ ............................................. B29D 11/00
[52] U.S. Cl. ..................................... 350/432; 350/413
[58] Field of Search .................................. 350/432, 413

[56] References Cited

U.S. PATENT DOCUMENTS

| | | | |
|---|---|---|---|
| 4,743,093 | 5/1988 | Oinen | 350/432 |
| 4,902,113 | 2/1990 | Ishiwata | 350/432 |

*Primary Examiner*—Paul M. Dzierzynski
*Attorney, Agent, or Firm*—Ladas & Parry

[57] ABSTRACT

In an aspherical glass lens element which has an optical axis, a focal length f, a thickness along the optical axis, and first and second aspherical convex surfaces defined by first and second predetermined formulae represented as functions of first and second radii $r_1$ and $r_2$ of curvature at apexes of the first and the second aspherical convex surfaces and first and second coefficients $k_1$ and $k_2$ of cones, f/D, $r_1/r_2$, and $k_1/k_2$ fall within the following ranges:

$2.0 < f/D < 4.0$,
$-0.5 < r_1/r_2 < -0.1$,
$-2 < k_1 < 1$, and
$-80 < k_2 < -10$.

A glass material of the aspherical glass lens element has a refractive index nd and an Abbe number νd selected within the following ranges:
$1.45 < nd < 1.55$ and
$75 < νd < 90$.

3 Claims, 7 Drawing Sheets

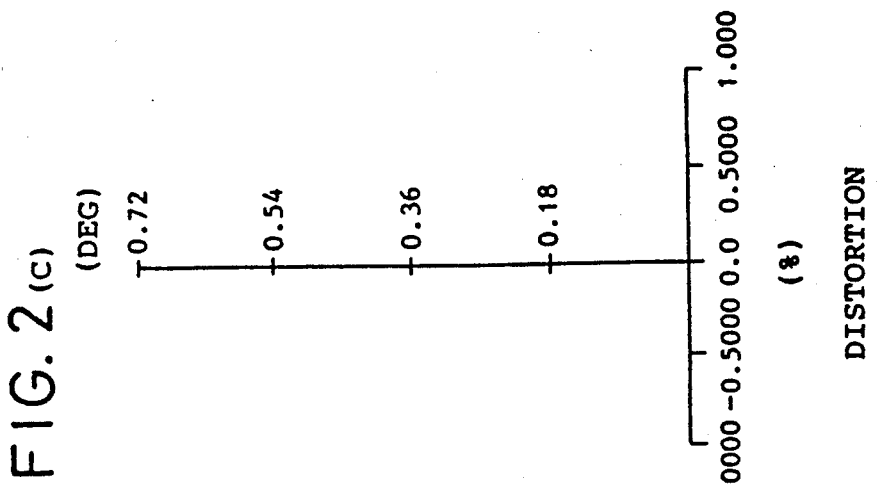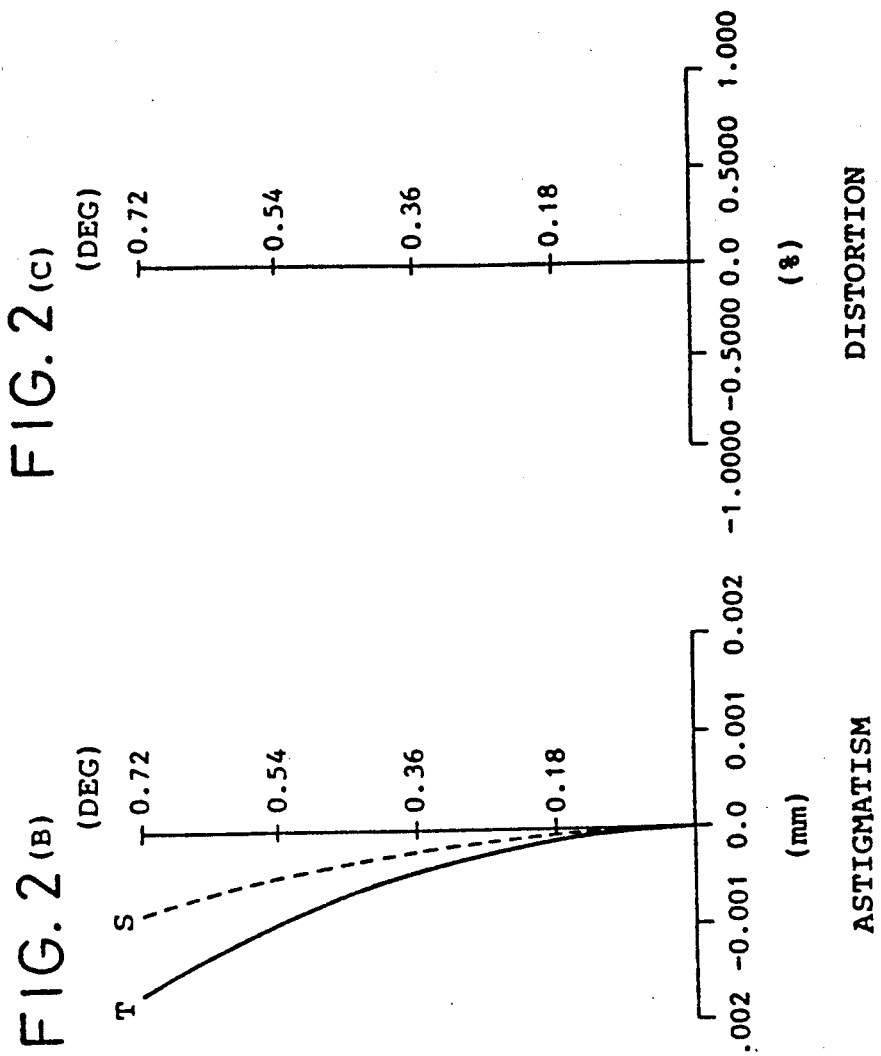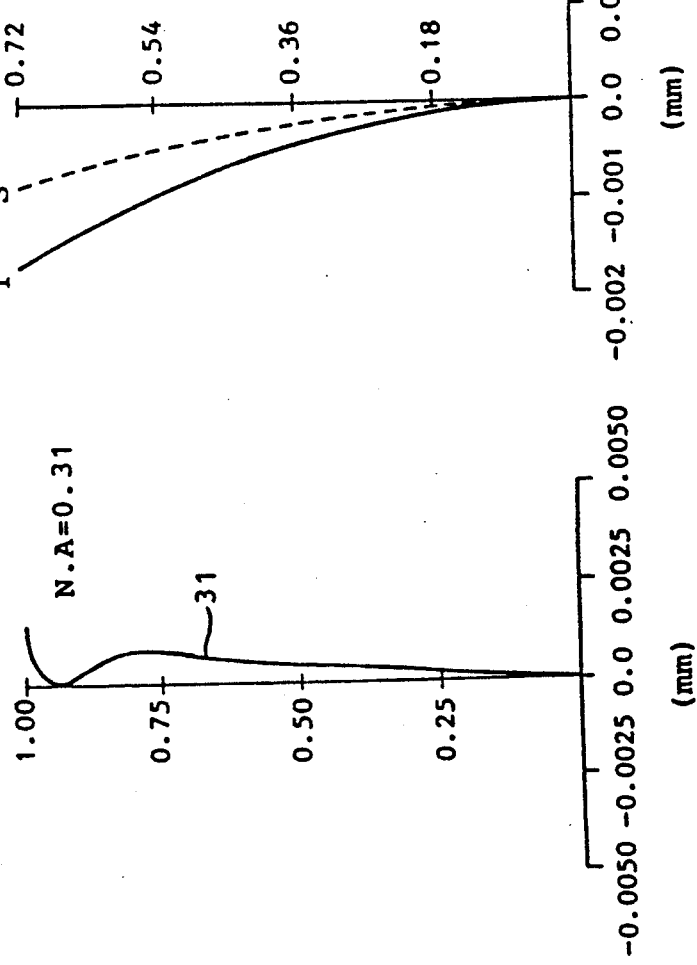

COMA

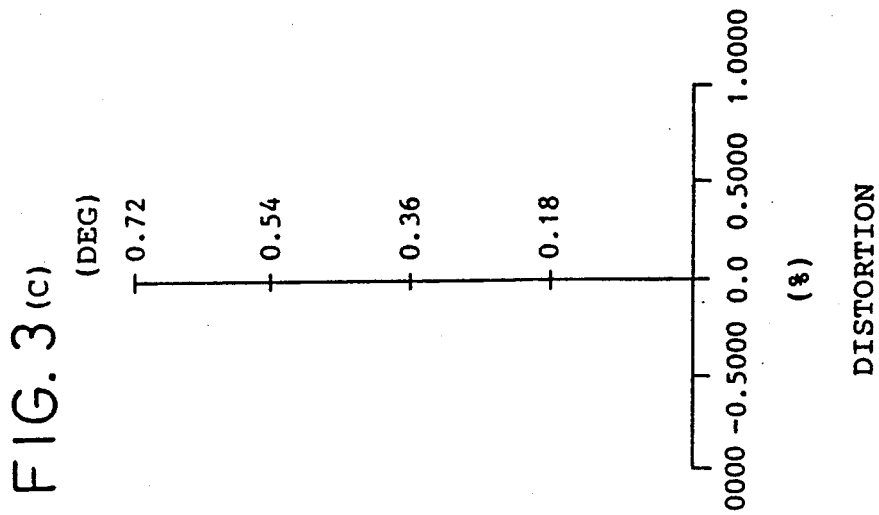
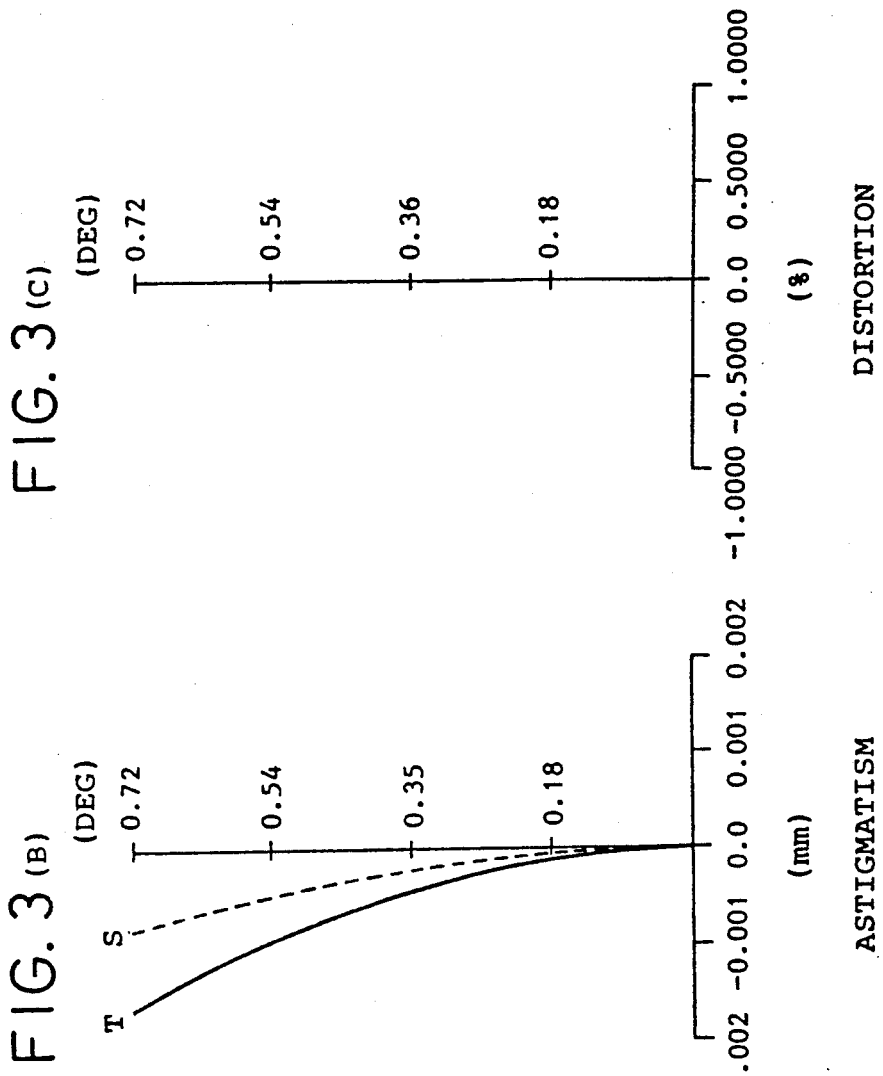
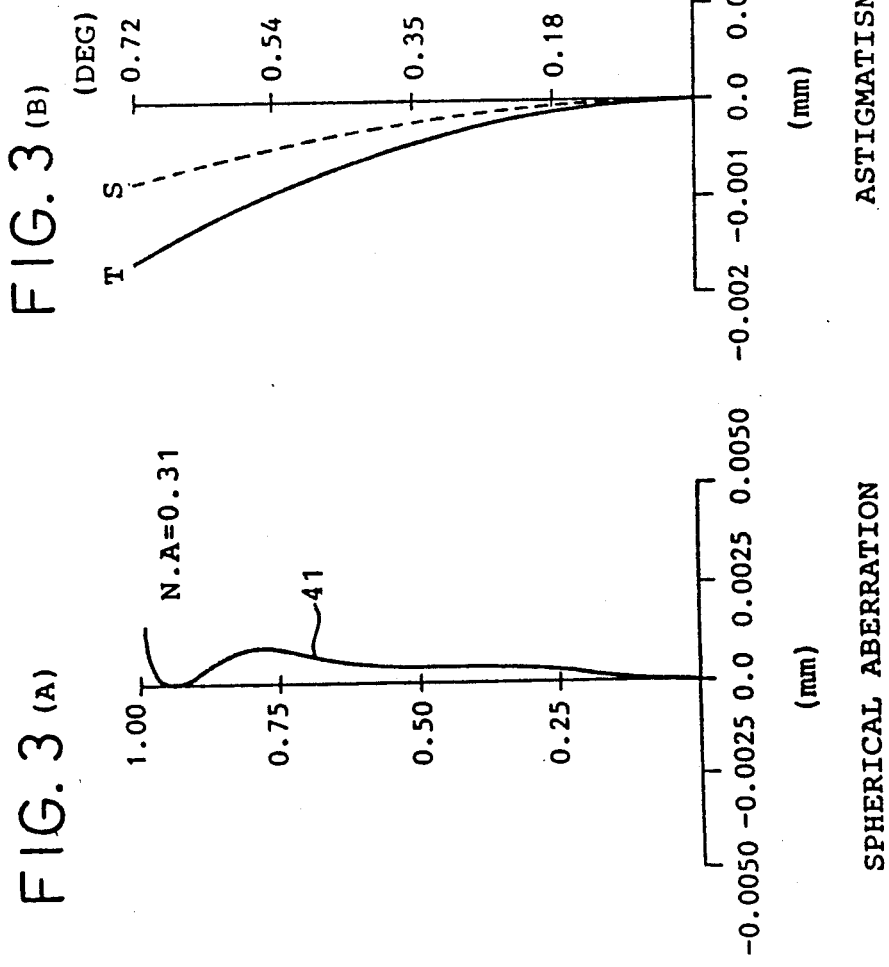

COMA

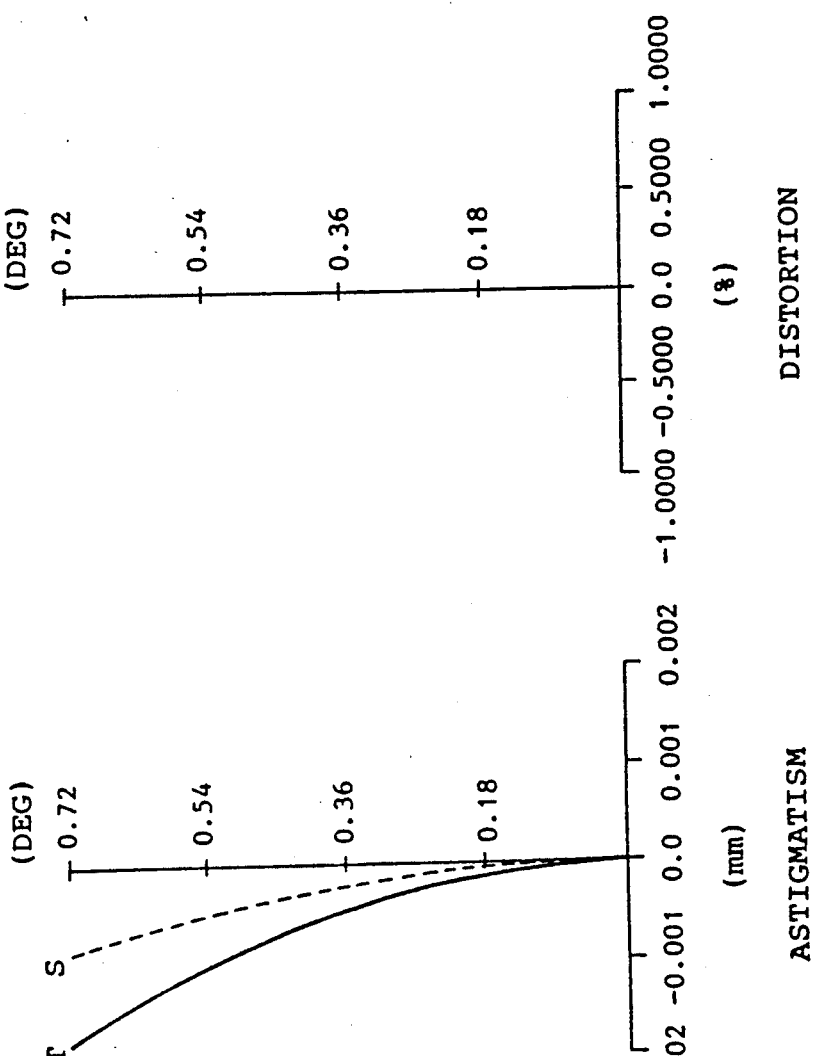

COMA

ASPHERICAL GLASS LENS ELEMENT SUITABLE FOR A COLLIMATOR LENS

BACKGROUND OF THE INVENTION

This invention relates to an aspherical glass lens element for use in an optical system of a disk device which may be, for example, a laser disk device, a disk device for a computer memory, a magnetic optical disk device, or the like and, in particular, to an aspherical glass lens element which is used for a collimator lens system in the disk device.

In general, a collimator lens system of the type described confronts a light source, such as a semiconductor laser, in an optical pickup device of a laser disk device and is for use in combination with an object lens system which is adjacent to an optical disk. Supplied with divergent rays from the light source, the collimator lens system serves to convert the divergent rays into parallel or collimated rays of a large aperture which is directed to the object lens system and which is focused on the optical disk. In this event, a degree of parallelization of the parallel rays should be strictly controlled because the degree of parallelization directly influences an operation of the laser disk device.

Herein, it is to be noted that an oscillation wavelength of a semiconductor laser is changed to another as an input current supplied to the semiconductor laser is varied from one to another. Such a variation of an input current brings about a variation of a chromatic aberration and results in degradation of the degree of parallelization of the parallel rays emitted from the collimator lens system.

Alternatively, consideration is made as regards an optical pickup device which is used in an optical rewritable disk device. In this case, write-in and readout operations are carried out in such an optical rewritable disk device by the use of a semiconductor laser. Inasmuch as such a semiconductor laser should raise up output power on the write-in operation in comparison with the readout operation, different oscillation wavelengths are generated from the semiconductor laser. Under the circumstances, the degree of parallelization of the parallel rays is undesirably degraded in the optical rewritable disk device also.

In order to avoid such degradation of the degree of parallelization and to correct the chromatic aberration, a combinational lens system is used as the collimator lens system. Specifically, such a collimator lens system is formed either by a first achromatic lens composed of a negative meniscus lens and a double-convex lens adhered to the negative meniscus lens or by a second achromatic lens composed of a pair of single lenses spaced apart from each other.

However, adherence of the negative meniscus lens to the double-convex lens and alignment of both the negative meniscus lens and the double-convex lens are required on manufacturing the first achromatic lens. On the other hand, it is very difficult to avoid decentration of the single lenses through an interval of space in the second achromatic lens.

As a result, the lenses and the lens mount must be precisely machined or processed on manufacturing the lenses and the lens mount. This makes it difficult to assemble the lenses and the lens mount and results in an increase of costs.

On the other hand, a plastic aspherical lens element is manufactured by injection molding and sold as the collimator lens system. By way of example, such an aspherical lens element is disclosed by Arai et al in U.S. Pat. No. 4,449,792, and has a large aperture, a long back focal length and a long working distance. The aspherical lens element disclosed by Arai et al may be used as a pickup lens for video disks and has an entrance or first surface and an exit or second surface both of which are defined by first and second predetermined formulae, respectively. Besides, a first factor of $(r_1/(n-1)f)$, a second factor of $k_1$, and a third factor of $k_2$ are selected within predetermined ranges, respectively, where $r_1$ represents a radius of curvature of the first surface; n, a refractive index of lens; f, a focal length of lens; and $k_1$ and $k_2$, coefficients of cones of the first and the second surfaces.

However, it has been found out that the plastic aspherical lens element causes the chromatic aberration to occur when it is used as the collimator lens for the optical disk device such that wavelengths are varied from each other in the write-in and the readout operations. In consequence, the degree of parallelization is degraded in the parallel rays.

Moreover, the plastic aspherical lens element is inferior to a glass aspherical lens element in a heat resistance, homogeneity, humidity durability, and a temperature characteristic. In addition, no consideration is made in Arai et al about using such a plastic aspherical lens element as a collimator lens of the optical disk device.

SUMMARY OF THE INVENTION

It is an object of this invention to provide an aspherical glass lens element which is used as a collimator lens system.

It is another object of this invention to provide an aspherical glass lens element of the type described, which can avoid a chromatic aberration even when incident rays of different wavelengths are incident on the aspherical glass lens element.

It is yet another object of this invention to provide an aspherical glass lens element of the type described, which has excellent heat resistance, homogeneity, humidity durability, and a temperature characteristic.

An aspherical glass lens element to which this invention is applicable has an optical axis, a focal length f, a thickness D along the optical axis, and first and second aspherical convex surfaces. The first and the second aspherical convex surfaces have first and second apexes through which the optical axis passes, first and second radii $r_1$ and $r_2$ of curvature at the first and the second apexes, and first and second coefficients $k_1$ and $k_2$ of cones, respectively, and are determined by first and second predetermined formulae represented as functions of the first and the second radii $r_1$ and $r_2$ and the first and the second coefficients $k_1$ and $k_2$ of cones. According to this invention, the aspherical glass lens element satisfies the following conditions:

$2.0 < f/D < 4.0$,
$-0.5 < r_1/r_2 < -0.1$,
$-2 < k_1 < 1$, and
$-80 < k_2 < -10$.

When the aspherical glass lens element is formed by a glass material specified by a refractive index nd and an Abbe number $\nu$d, the refractive index nd and the Abbe number $\nu$d fulfill the following conditions:

$1.45 < nd < 1.55$ and
$75 < \nu d < 90$

DESCRIPTION OF THE PREFERRED EMBODIMENT

Figure 1:
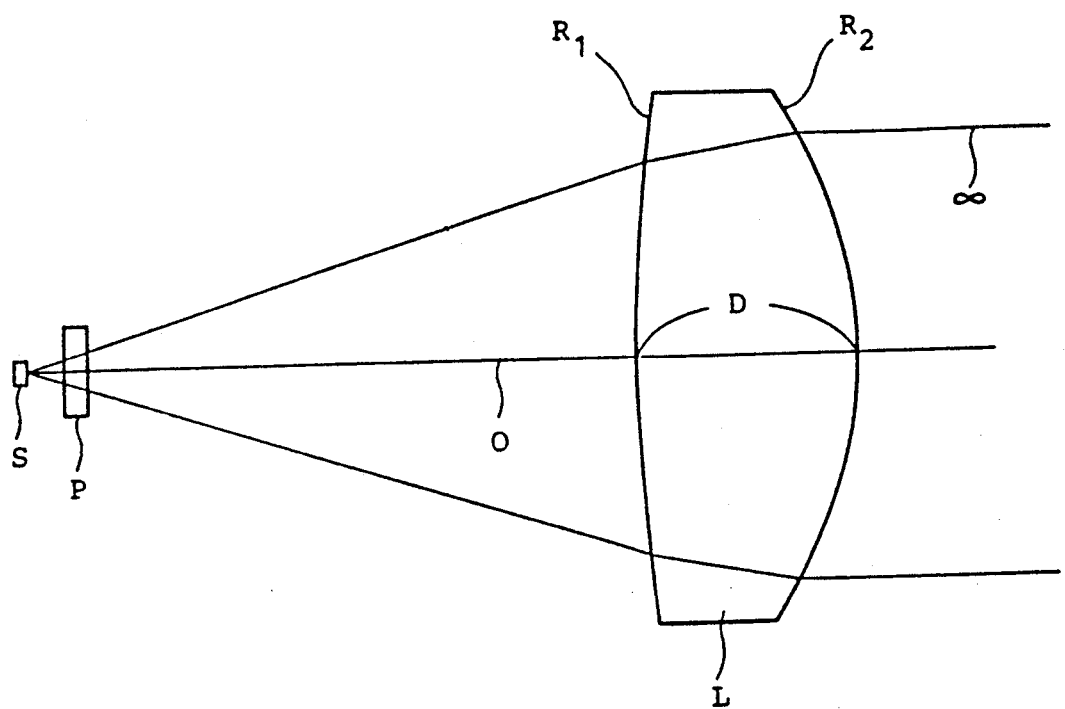
FIG. 1 shows a side view of an optical system which comprises an aspherical glass single lens element according to the present invention.

Referring to FIG. 1, an optical system comprises a semiconductor laser S for generating a laser beam along an optical axis O, a cover glass plate P of the semiconductor laser S having a pair of parallel surfaces, and a single collimator lens element which may be formed by an aspherical glass lens element L according to this invention. The laser beam is incident through the cover glass plate P onto the aspherical glass lens element L and is converted into collimated or parallel rays symbolized by $\infty$. Thus, the illustrated aspherical glass lens element L has an entrance (first) surface on the lefthand side of FIG. 1 and an exit (second) surface on the righthand side of FIG. 1.

In order to attain the parallel rays of high precision, axial and offaxial aberrations are calculated and thereafter corrected so that they fall within a diffraction limit of light on the assumption that parallel rays are incident on the second surface $R_2$ from the righthand side of FIG. 1.

The aspherical glass lens element L designed under the above-mentioned assumption is formed by a single double-convex or biconvex lens element which has aspherical convex surfaces of axial symmetry as the first and the second surfaces $R_1$ and $R_2$. As illustrated in FIG. 1, the first and the second surfaces $R_1$ and $R_2$ are convex towards the lefthand and the righthand sides of FIG. 1, respectively, and may be called first and second aspherical convex surfaces which have apexes along an optical axis, respectively.

In the example being illustrated, the first aspherical convex and the second aspherical convex surfaces $R_1$ and $R_2$ are given by:

$$Z_1 = (C_1 Y^2)/(1 + (1 + (1-k_1)C_1^2 Y^2)^{\frac{1}{2}}) + E_1 Y^4 + F_1 Y^6 + G_1 Y^8 + H_1 Y^{10} \text{ and}$$

$$Z_2 = (C_2 Y^2)/(1 + (1 - (1+k_2)C_2^2 Y^2)^{\frac{1}{2}}) + E_2 Y^4 + F_2 Y^6 + G_2 Y^8 + H_2 Y^{10},$$

where Y represents an incident height from the optical axis; $Z_1$ represents a distance between a point placed on the first aspherical convex surface at the incident height Y and a tangential plane which is tangential to the first aspherical convex surface at the apex of the first aspherical convex surface; $Z_2$ represents a distance between a point placed on the second aspherical convex surface at the incident height Y and a tangential plane which is tangential to the second aspherical convex surface at the apex of the second aspherical convex surface; $C_1$ represents curvature at the apex of the first aspherical convex surface and is equal to a reciprocal of a radius $r_1$, namely, $(1/r_1)$ measured at the apex of the first aspherical surface $R_1$; $C_2$ represents curvature at the apex of the second aspherical convex surface and is equal to a reciprocal of a radius $r_2$, namely, $(1/r_2)$ measured at the apex of the second aspherical convex surface $R_2$; $k_1$ represents a first coefficient of cone of the first aspherical convex surface $R_1$; $k_2$ represents a second coefficient of cone of the second aspherical convex surface $R_2$; $E_1$, $F_1$, $G_1$, and $H_1$ represent aspherical coefficients of the first aspherical convex surface, which are proportional to fourth, sixth, eighth, and tenth power of the incident height Y; and $E_2$, $F_2$, $G_2$, and $H_2$ represent aspherical coefficients of the second aspherical convex surface, which are proportional to fourth, sixth, eighth, and tenth power of the incident height Y.

Moreover, the aspherical glass lens element L according to the present invention fulfills the following Inequalities.

$$2.0 < f/D < 4.0, \tag{1}$$

$$-0.5 < r_1/r_2 < -0.1, \tag{2}$$

$$-2 < k_1 < 1, \tag{3}$$

$$-80 < k_2 < -10, \tag{4}$$

$$1.45 < nd < 1.55, \tag{5}$$

$$75 < \nu d < 90, \text{ and} \tag{6}$$

$$Tg > 430°, \tag{7}$$

where f is representative of a focal length of the aspherical lens element L; D, a thickness along the optical axis; nd, a refractive index of a glass material of the aspherical glass lens element which is exhibited with respect to a d-ray; $\nu d$, a dispersion ratio, i.e., Abbe number of the glass material of the aspherical glass lens element L; and Tg, a transformation temperature of the glass material.

In the collimator lens formed by the aspherical lens element L designed in the above-mentioned manner, let a value of f/D represented by Inequality (1) become smaller than 2.0. In this case, the thickness D of the aspherical lens element L becomes too thick in comparison with the focal length f. As a result, it is difficult to make the optical system compact. On the other hand, when the value of f/D exceeds 4.0, comae and astigmatisms are degraded with respect to offaxial rays to an unacceptable extent.

The term of $(r_1/r_2)$ of Inequality (2) is for restricting decentration between the first and the second aspherical convex surfaces $R_1$ and $R_2$ to an allowed tolerance. In other words, it is possible to avoid such decentration resulting from a processing error which occurs on manufacturing the aspherical glass lens element L. When the term of $(r_1/r_2)$ exceeds a lower limit of $-0.5$ and an upper limit of $-0.1$, practical performance is undesirably deteriorated.

The first coefficient $k_1$ of cone of the first aspherical convex surface $R_1$ is for favorably correcting a spherical aberration of the first aspherical convex surface $R_1$. If the first coefficient $k_1$ of cone is present outside of a range indicated by Inequality (3), the spherical aberration can not be favorably corrected.

Likewise, the second coefficient $k_2$ of the second aspherical convex surface $R_2$ is for favorably correcting comae of the second aspherical convex surface $R_2$. The comae cannot be favorably improved when the second coefficient $k_2$ exceeds a range limited by Inequality (4).

The refractive index nd and the Abbe number $\nu d$ of Inequalities (5) and (6) show ranges which are different from the plastics and which therefore specify a glass material used as an optical material of the aspherical glass lens element L.

As readily understood from Inequality (6), the glass material is a low dispersion glass material. When such a low dispersion glass material is used, it is possible to minimize occurrence of each aberration and a shift or movement of a focal plane which occurs as a wavelength is varied. Consequently, the aspherical glass lens element L of a low dispersion glass material can be used in a pickup device of a rewritable optical disk device.

Moreover, when the aspherical glass lens element L is formed by the glass material as mentioned above, the aspherical glass lens element L is excellent in homogeneity and atmospheric characteristics, such as heat resistance, humidity durability, and a temperature characteristic. When the refractive index nd and the Abbe number $\nu d$ exceed the above ranges, the aspherical glass lens element L is not suitable for the collimator lens element used in the rewritable optical disk device.

In addition, the transformation temperature Tg of the glass material is defined by Inequality (7) and is selected at a temperature higher than 430° C. When Inequality (7) is satisfied, the low dispersion glass material has a good transfer characteristic in a mold. Accordingly, it is possible to manufacture the aspherical glass lens element L by glass molding when the glass material fulfills Inequality (7). In other words, a restriction of Inequality (7) enables mass production of the aspherical glass lens element L.

Table 1 shows aspherical glass lens elements according to first through third embodiments (Embodiments 1, 2, and 3) of the present invention.

TABLE 1

|  | Embodiment 1 | Embodiment 2 | Embodiment 3 |
| --- | --- | --- | --- |
| f | 8.00 | 8.00 | 8.00 |
| D | 2.6500 | 2.700 | 2.55 |
| $r_1$ | 5.22265 | 5.32119 | 4.38458 |
| $k_1$ | −0.805713 | −0.832958 | −0.594324 |
| $E_1$ | −0.219176E-3 | −0.247167E-3 | −0.562688E-4 |
| $F_1$ | −0.500459E-4 | −0.540623E-4 | 0.105889E-4 |
| $G_1$ | −0.707755E-5 | −0.805883E-5 | 0.302219E-5 |
| $H_1$ | −0.10231E-6 | −0.453972E-7 | 0.412886E-7 |
| $r_2$ | −13.31522 | −12.60073 | −31.16117 |
| $k_2$ | −21.871856 | −20.906799 | −52.990617 |
| $E_2$ | −0.978640E-3 | −0.113032E-2 | 0.232270E-3 |
| $F_2$ | −0.752019E-4 | −0.781016E-4 | 0.237783E-4 |
| $G_2$ | −0.127070E-4 | −0.135946E-4 | 0.118174E-4 |
| $H_2$ | 0.102635E-5 | 0.116177E-5 | −0.886749E-6 |
| f/D | 3.0189 | 2.9630 | 3.1373 |
| $r_1/r_2$ | −0.3922 | −0.4223 | −0.1407 |
| nd | 1.497 | 1.497 | 1.497 |
| $\nu d$ | 81.6 | 81.6 | 81.6 |

Referring to FIGS. 2(A) through (I), illustrations are made about optical characteristics of the aspherical glass lens element according to the first embodiment of this invention. Specifically, a spherical aberration and an astigmatism are shown in FIGS. 2(A) and (B) as examples of the optical characteristics of the aspherical glass lens element according to the first embodiment, respectively. In FIG. 2(A), an ordinate represents a ratio of a height of an incident parallel ray from an optical axis and a height of an aperture stop on the assumption that the height of the aperture stop is kept at unity. An abscissa represents a position at which the incident rays intersect the optical axis. An origin of the graph is representative of a focal point while plus and minus regions of FIG. 2(A) correspond to righthand and lefthand directions along the optical axis of FIG. 1, respectively. As shown in FIG. 2(A), the aspherical glass lens element L according to the first embodiment of this invention has a numerical aperture (N.A.) of 0.31 and the spherical aberration specified by a spherical aberration curve 31.

In FIG. 2(B), an ordinate represents a half field angle of offaxial rays while an abscissa represents a light collection point at each field angle in terms of a dislocation of the focal point towards an optical axis direction. In this figure, curves T and S represent light collection points on tangential and sagittal planes, respectively.

In FIG. 2(C), a distortion is illustrated in relation to a field angle taken along an ordinate of FIG. 2(C) and to a percentage (%) of the distortion taken along an abscissa. As illustrated in FIG. 2(C), no distortion takes place in the aspherical glass lens element L.

In addition, FIGS. 2(D) and (E) show comae which are calculated along tangential (meridional) and sagittal directions with respect to an incident ray on the first surface $R_1$ at a field angle of 100%, respectively, and are specified by tangential and sagittal aberration curves 32 and 33. As well known in the art, the abscissa and the ordinate of each of FIGS. 2(D) and (E) represent a distance from a principal ray and a difference height between the principal ray and a tracing ray, respectively.

Likewise, FIGS. 2(F) and (G) show comae calculated in tangential and sagittal directions with respect to an incident ray on the first surface $R_1$ at a field angle of 50%, respectively, and are specified by additional tangential and sagittal aberration curves 34 and 35.

Moreover, FIGS. 2(H) and (I) show comae calculated in the tangential and the sagittal directions with respect to a ray on axis and are specified by axial tangential and sagittal aberration curves 36 and 37.

Referring to FIGS. 3(A) through (I) which are in one-to-one correspondence to FIGS. 2(A) through (I), respectively, optical characteristics of the aspherical glass lens element according to the second embodiment of this invention are illustrated so as to clarify effectiveness of this invention. In this connection, it is readily understood that curves 41, T, S, 42, 43, 44, 45, 46, and 47 exhibit aberration curves similar to those illustrated in FIGS. 2(A) through (I), respectively.

Referring to FIGS. 4(A) through (I), the aspherical glass lens element according to the third embodiment of this invention has a spherical aberration, an astigmatism, and comae specified by aberration curves 51, T, S, and 52 through 57 corresponding to 31, T, S, and 32 through 37 illustrated in FIGS. 2(A) through (I).

Figure 2:
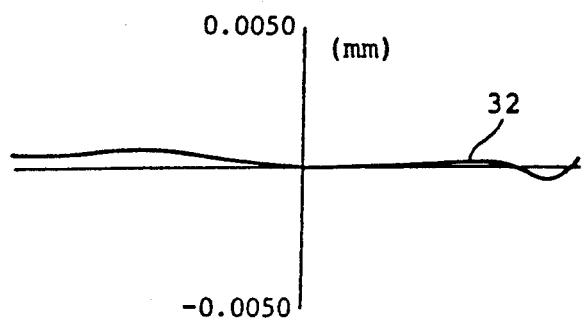
FIGS. 2(A) through (I) show graphical representations of optical characteristics of an aspherical glass lens element according to a first embodiment of this invention.
Figure 2:
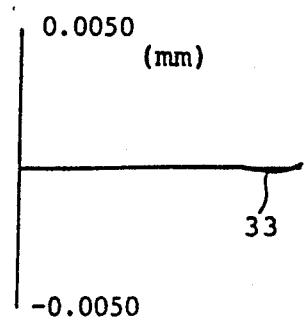
Figure 2:
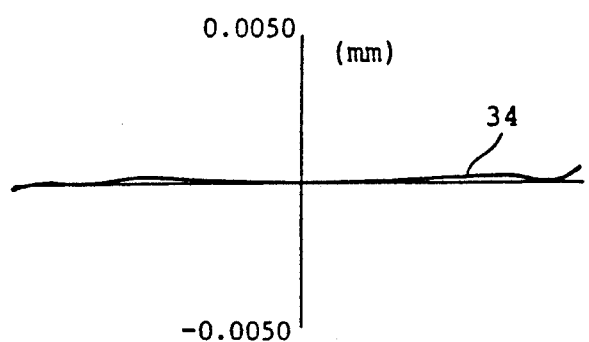
Figure 2:
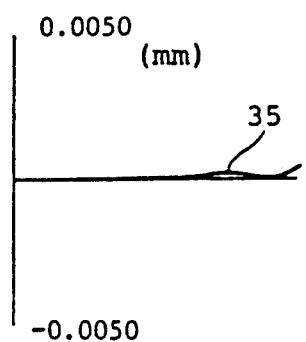
Figure 2:
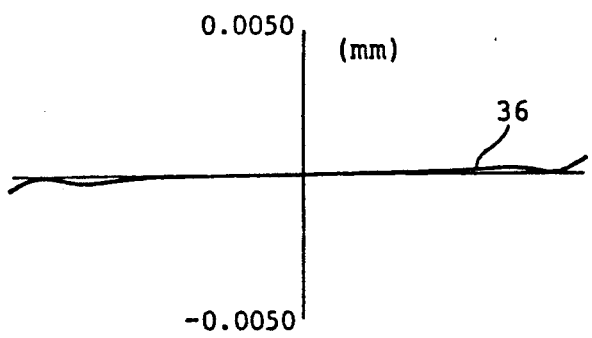
Figure 2:
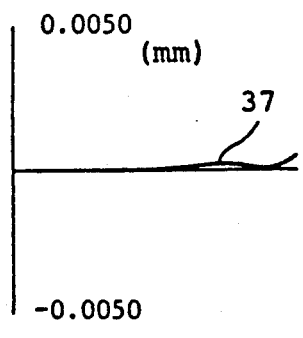
Figure 3:
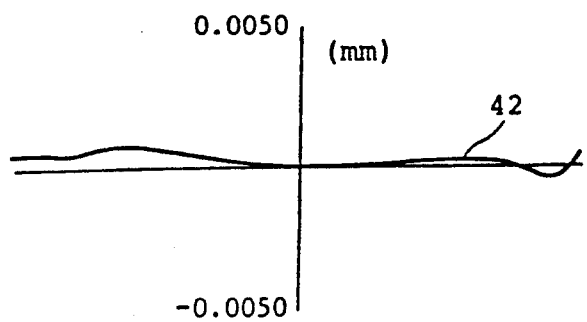
FIGS. 3(A) through (I) show similar optical characteristics of an aspherical glass lens element according to a second embodiment of this invention.
Figure 3:
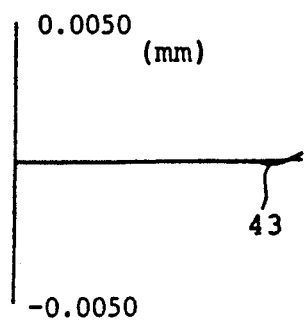
Figure 3:
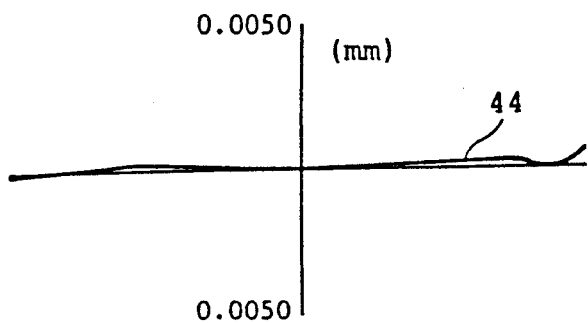
Figure 3:
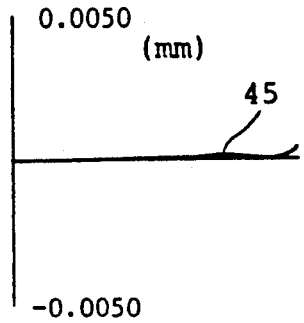
Figure 3:
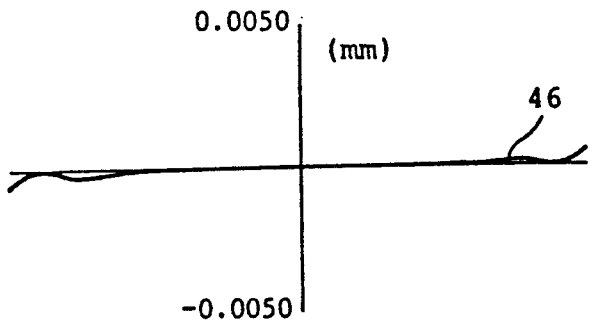
Figure 3:
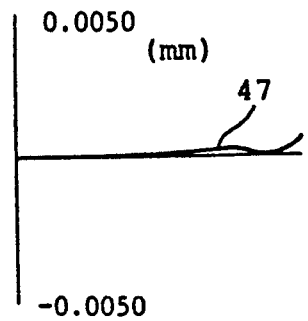
Figure 4:
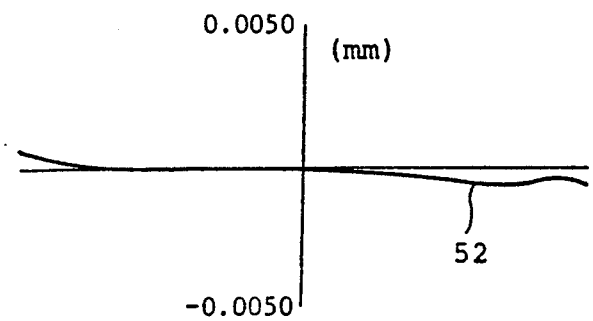
FIGS. 4(A) through (I) show similar optical characteristics of an aspherical glass lens element according to a third embodiment of this invention.
Figure 4:
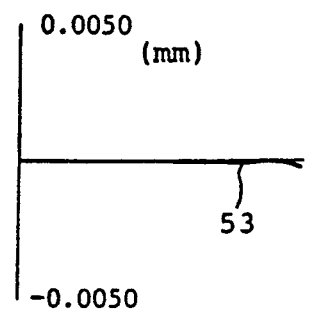
Figure 4:
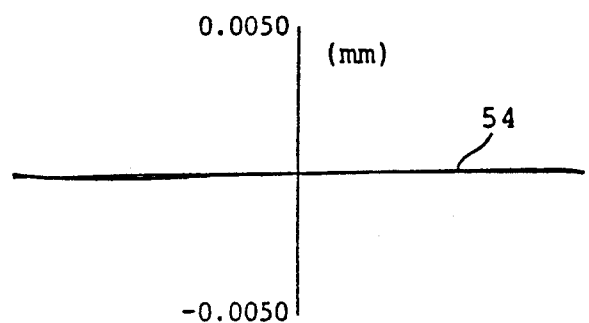
Figure 4:
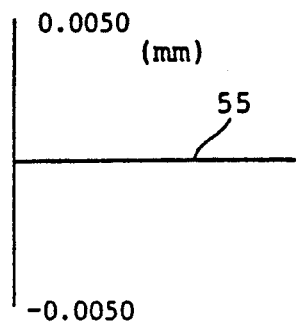
Figure 4:
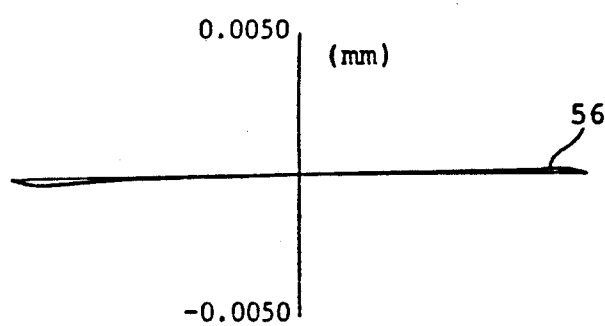
Figure 4:
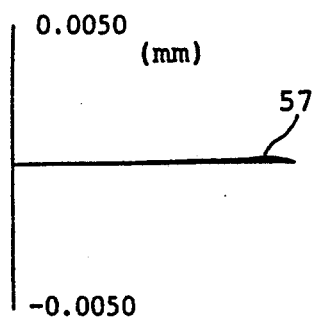

As readily understood from each of the aberration curves illustrated in FIGS. 2 through 4, each aspherical glass lens element according to the first through the third embodiments of this invention has, within the field angle between ±1 degree, excellent optical characteristics which are not less than those of the combinational glass lens systems.

While this invention has thus far been described in conjunction with several embodiments thereof, it will readily be possible for those skilled in the art to put this invention into practice in various other manners. For example, Equations of $Z_1$ and $Z_2$ may include odd-numbered terms in addition to even-numbered terms.

What is claimed is:

1. An aspherical glass lens formed by a glass material having a transformation temperature Tg higher than 430° C., said aspherical glass lens having an optical axis, a focal length f, a thickness D along said optical axis, first and second aspherical convex surfaces, a refractive index nd and an Abbe number $(\nu)$d, said first and second aspherical convex surfaces having first and second apexes through which said optical axis passes, first and second of curvature radii $r_1$ and $r_2$ at said first and second apexes, and first and second coefficients $k_1$ and $k_2$ of cones, respectively, and being determined by first and second predetermined formulae given by:

$$Z_1 = (C_1 Y^2)/(1 + (1-(1+k_1)C_1^2 Y^2)^{\frac{1}{2}}) + E_1 Y^4 + F_1 Y^6 + G_1 Y^8 + H_1 Y^{10} \text{ and}$$

$$Z_2 = (C_2 Y^2)/(1 + (1-(1+k_2)C_2^2 Y^2)^{\frac{1}{2}}) + E_2 Y^4 + F_2 Y^6 + G_2 Y^8 + H_2 Y^{10}$$

where
- Y is representative of an incident height from the optical axis;
- $Z_1$ is representative of a distance between a point placed on the first surface at the incident height Y and a tangential plane which is tangential to the first surface at the apex of the first surface;
- $Z_2$ is representative of a distance between a point placed on the second surface at the incident height Y and a tangential plane which is tangential to the second surface at the apex of the second surface;
- $C_1$ is curvature of the apex of the first surface $R_1$ and is equal to $(1/r_2)$;
- $C_2$ is curvature of the apex of the second surface $R_2$ and is equal to $(1/r_2)$;
- $K_1$ is representative of a coefficient of cone of the first surface;
- $K_2$ is representative of a coefficient of cone of the second surface;
- $E_1, F_1, G_1$, and $H_1$ and representative of those aspherical coefficients of the first surface which are proportional to fourth, sixth, eighth, and tenth power of the incident height Y, respectively, and
- $E_2, F_2, G_2$ and $H_2$ are representative of those aspherical coefficient of the second surface which are proportional to fourth, sixth, eighth, and tenth power of the incident height Y;
- where in turn $r_1$ and $r_2$ are representative of radii of curvature of the apexes of the first and the second surfaces $R_1$ and $R_2$, respectively,
- said aspherical glass lens element being defined by the following numerical data:

f=8.00, D=2.6500, $r_1$=5.22265, $k_1$=−0.805713,
$E_1$=−0.219176E−3, $F_1$=−0.500459E−4,
$G_1$=−0.707755E−5, $H_1$=−0.10231E−6,,
$r_2$=−13.31522, $k_2$=−21.871856, $E_2$=−0.978640E−3,
$F_2$=−0.752019E−4,
$G_2$=−0.127070E−4, $H_2$=0.102635E−5,
f/D=3.0189, $r_1/r_2$=−0.3922, nd=1.497 and $\nu$d=81.6.

2. An aspherical glass lens formed by a glass material being a transformation temperature Tg higher than 430° C., said aspherical glass lens having an optical axis, a focal length f, a thickness D along said optical axis, first and second aspherical convex surfaces, a refractive index nd and an Abbe number $(\nu)$d, said first and second aspherical convex surfaces having first and second apexes through which said optical axis passes, first and second radii $r_1$ and $r_2$ of curvature at said first and second apexes, and first and second coefficients $k_1$ and $k_2$ of cones, respectively, and being determined by first and second predetermined formulae given by:

$$Z_1 = (C_1 Y^2)/(1 + (1-(1+k_1)C_1^2 Y^2)^{\frac{1}{2}}) + E_1 Y^4 + F_1 Y^6 + G_1 Y^8 + H_1 Y^{10} \text{ and}$$

$$Z_2 = (C_2 Y^2)/(1 + (1-(1+k_2)C_2^2 Y^2)^{\frac{1}{2}}) + E_2 Y^4 + F_2 Y^6 + G_2 Y^8 + H_2 Y^{10}$$

where
- Y is representative of an incident height from the optical axis;
- $Z_1$ is representative of a distance between a point placed on the first surface at the incident height Y and a tangential plane which is tangential to the first surface at the apex of the first surface;
- $Z_2$ is representative of a distance between a point placed on the second surface at the incident height Y and a tangential plane which is tangential to the second surface at the apex of the second surface;
- $C_1$ is curvature of the apex of the first surface $R_1$ and is equal to $(1/r_2)$;
- $C_2$ is curvature of the apex of the second surface $R_2$ and is equal to $(1/r_2)$;
- $K_1$ is representative of a coefficient of cone of the first surface;
- $K_2$ is representative of a coefficient of cone of the second surface;
- $E_1, F_1, G_1$, and $H_1$ are representative of those aspherical coefficients of the first surface which are proportional to fourth, sixth, eighth, and tenth power of the incident height Y, respectively, and
- $E_2, F_2, G_2$ and $H_2$ are representative of those aspherical coefficients of the second surface which are proportional to fourth, sixth, eighth, and tenth power of the incident height Y;
- where in turn $r_1$ and $r_2$ are representative of radii of curvature of the apexes of the first and the second surfaces $R_1$ and $R_2$, respectively,
- said aspherical glass lens element being defined by the following numerical data:

f=8.00, D=2.700, $r_1$=5.32119, $k_1$=−0.832958,
$E_1$=−0.247167E−3, $F_1$=−0.540623E−4,
$G_1$=−0.805883E−5, $H_1$=−0.453972E−7,
$r_2$12.60073, $k_2$=−20.906799, $E_2$=−0.113032E−2,
$F_2$=−0.781016E−4, $G_2$=−0.135946E−4,
$H_2$=−0.116177E−5, f/D=2.9630,
$r_1/R_2$=−0.4223, nd=1.497 and $\nu$d=81.6.

3. An aspherical glass lens formed by a glass material being a transformation temperature Tg higher than 430° C., said aspherical glass lens having an optical axis, a focal length f, a thickness D along said optical axis, first and second aspherical convex surfaces, a refractive index nd and an Abbe number $(\nu)$d, said first and second aspherical convex surfaces having first and second apexes through which said optical axis passes, first and second radii $r_1$ and $r_2$ of curvature at said first and second apexes, and first and second coefficients $k_1$ and $k_2$ of cones, respectively, and being determined by first and second predetermined formulae given by:

$$Z_1 = (C_1 Y^2)/(1 + (1-(1+k_1)C_1^2 Y^2)^{\frac{1}{2}}) + E_1 Y^4 + F_1 Y^6 + G_1 Y^8 + H_1 Y^{10} \text{ and}$$

$$Z_2 + (C_2 Y^2)/(1 + (1-(1+k_2)C_2^2 Y^2)^{\frac{1}{2}}) + E_2 Y^4 + F_2 Y^6 + G_2 Y^8 + H_2 Y^{10}$$

where

Y is representative of an incident height from the optical axis;

Z$_1$ is representative of a distance between a point placed on the first surface at the incident height Y and a tangential plane which is tangential to the first surface at the apex of the first surface;

Z$_2$ is representative of a distance between a point placed on the second surface at the incident height Y and a tangential plane which is tangential to the second surface at the apex of the second surface;

C$_1$ is curvature of the apex of the first surface R$_1$ and is equal to (1/r$_2$);

C$_2$ is curvature of the apex of the second surface R$_2$ and is equal to (1/r$_2$);

K$_1$ is representative of a coefficient of cone of the first surface;

K$_2$ is representative of a coefficient of cone of the second surface;

E$_1$, F$_1$, G$_1$, and H$_1$ are representative of those aspherical coefficients of the first surface which are proportional to fourth, sixth, eighth, and tenth power of the incident height Y, respectively, and E$_2$, F$_2$, G$_2$ and H$_2$ are representative of those aspherical coefficients of the second surface which are proportional to fourth, sixth, eighth, and tenth power of the incident height Y;

where in turn r$_1$ and r$_2$ are representative of radii of curvature of the apexes of the first and the second surfaces R$_1$ and R$_2$, respectively, said aspherical glass lens element being defined by the following numerical data:

f=8.00, D=2.55, r$_1$=4.38458, k$_1$=−0.594324, E$_1$=0.562688E−4, F$_1$=0.105889E−4, G$_1$=−0.302210E−5, H$_1$=0.412886E−7, r$_2$=−31.16117, k$_2$=−52.990617, E$_2$=−0.232270E3, F$_2$=0.237783E−4, G$_2$=0.118174E−4, H$_2$=−0.886749E−6, f/D=3.1373, r$_1$/r$_2$=−0.1407, nd=1.497 and νd=81.6.

* * * * *